March 23, 1937.   F. G. LOGAN   2,074,552
VOLTAGE REGULATOR
Filed May 20, 1933
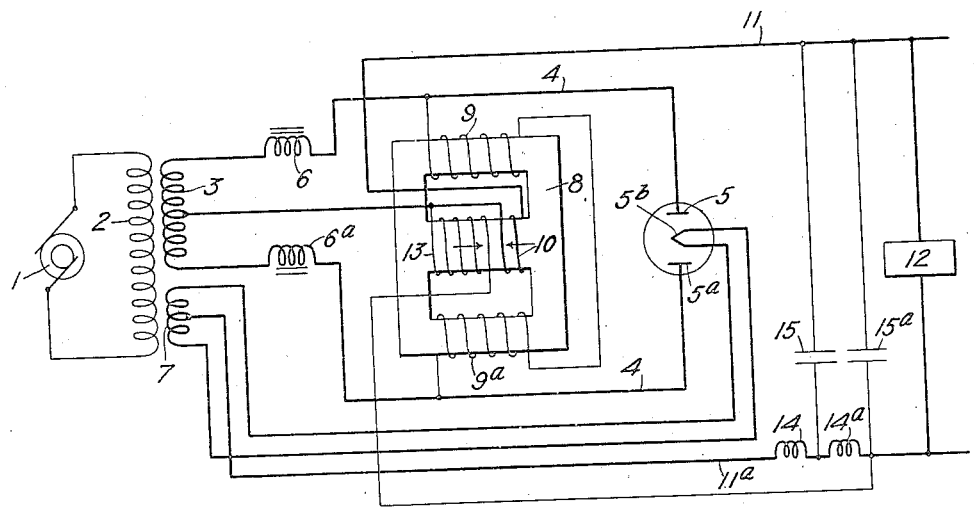
INVENTOR
Frank G. Logan
BY
Lawrence K. Sager
his ATTORNEY Patented Mar. 23, 1937

2,074,552

UNITED STATES PATENT OFFICE 2,074,552

VOLTAGE REGULATOR

Frank G. Logan, Mount Vernon, N. Y., assignor to Ward Leonard Electric Company, a corporation of New York Application May 20, 1933, Serial No. 671,985

17 Claims. (Cl. 175—363)

This invention particularly relates to the control or regulation of the voltage of a consumption circuit wherein the energy is derived from an alternating current source and rectified for use in the consumption circuit. The voltage of the consumption circuit when using a rectifier varies considerably with change of load, the change of voltage between no load and full load being considerable, especially where filtering devices are used. This decrease in the voltage of the direct current consumption circuit with increase of load imposed upon the rectifier, is particularly objectionable in certain uses, it being highly important to maintain the voltage substantially constant under all loads for some purposes, whereas in others it is desirable to have the voltage supplied to the direct current consumption circuit gradually increase with increase of load and in other cases it may be desirable to control the voltage in some particular manner as required in certain uses.

One of the main objects of the present invention is to provide a method and means of control for automatically regulating the voltage as desired with change of load and to accomplish this by auxiliary controlling apparatus which will be comparatively inexpensive and dependable with long continued use. Another important object is to avoid the use of moving parts. Another important object is to provide a form of apparatus which will require no particular care or attention during long continued operation. Another object is to provide means which may be conveniently assembled and installed and require small space. Another object is to provide a controller which will be efficient in operation and permit the use of comparatively small controlling current in accomplishing the required regulation between no load and full load. Other objects and advantages will be understood from the following description and accompanying drawing which illustrates a preferred embodiment of this invention.

The drawing is a diagram indicating the apparatus and showing the connections thereof.

The invention is based upon the automatic control of the recurring transient conditions of the circuits through the rectifier; and in my pending application Serial No. 535,600 filed May 7, 1931, I have described and broadly claimed the control of the voltage and current of a direct current consumption circuit supplied by a rectifier, this control being accomplished by affecting the recurring transient conditions.

In a rectifying circuit containing no inductance, the rectified current is in phase with the supply potential with conduction starting in each cycle when the supply potential exceeds the characteristic inherent voltage drop of the rectifier. If reactance is introduced into the circuit, conduction starts at approximately the same supply potential as before reactance was introduced. However, due to the fact that the current, or energy, is initiated at a time phase unsuitable to the energy conditions of the circuit, modification of the current occurs until energy is stored in the reactance. This storage cannot be accomplished instantly and as the rectifier conducts, the current rises gradually from zero until the time phase appropriate to the particular combination of reactance and resistance is approximated as nearly as may be before the current ceases to flow, that is before the rectification ceases. It is apparent that if the energy conditions of the reactance can be pre-adjusted to be more or less appropriate to the normal conditions required by the amount of supply voltage at the moment conduction starts, the resultant voltage delivered to the direct current consumption circuit will be decreased or increased at will. The adjustment of the reactance energy state may be accomplished by change of the amount of that energy or by adjustment of the time relative to the supply voltage at which the rectifier starts conduction. The conventional representation of the adjustment of a newly initiated circuit containing reactance to the appropriate time phase with the supply voltage, is that of steady state conditions plus a transient term lasting normally a few cycles. Therefore, it may be considered that control of transient conditions of energy or current in a rectifier circuit will control the voltage applied to the direct current consumption circuit. The so-called transient conditions exist while the rectifier is actively conducting current and recur each cycle. The phenomena of transients in a rectifier circuit are those of recurring transients.

The present invention provides a method and means for automatically controlling these recurring transient conditions for the purpose of regulating the voltage of the consumption circuit and for maintaining the same approximately constant under change of load, or for affecting the voltage as may be desired with change of load.

Referring to the drawing, a source of alternating current energy is indicated at 1 supplying a transformer having a primary 2 and a secondary winding 3. From each of the terminals of the winding 3 a line 4 extends to the anodes or plates 5, 5ª of a full wave rectifier. In each of these supply lines to the rectifier is inserted an impedance device or a series anode reactor or choke 6, 6a of the usual type which have been and are commonly used for increasing the duration of current flow in the anode circuit. The cathode 5b of the rectifier, or filament in the form of rectifier shown, has its terminals connected to the terminals of an auxiliary secondary winding 7 of the supply transformer. The auxiliary winding 7 serves to supply the heating energy to the filament 5b.

The controlling or regulating impedance device or reactor for automatically regulating the voltage of the consumption circuit under different load conditions is shown as being formed of a three-legged laminated core 8 having the ends of the three legs connected by end crosspieces. On each of the outside legs is a winding 9, 9a connected in series with each other and connected across the anode lines 4, 4 at points between the anode reactors and anodes of the rectifier, as shown in the drawing. Upon the middle leg of the core is a series winding 10 connected in series in the direct current consumption circuit, so as to be subjected to any change of load in the consumption circuit. This direct current consumption circuit extends from the mid-point of the secondary winding 3 through the winding 10 on the reactor and thence by the line 11 to the load 12. The return path of this circuit is by a line 11a to the mid-point of the secondary winding 7 and thence through this winding to the cathode 5b and then alternately through the anodes 5 and 5a and lines 4, 4 to the terminals of the secondary winding 3. The middle leg of the core 8 is also provided with a shunt winding 13 which is connected to the line 11 of the consumption circuit, and is shown as connected at a point between the series winding 10 and the mid-point of the secondary winding 3. The other terminal of the shunt winding is connected to the other line 11a of the consumption circuit preferably at a point where it would be directly subjected to the load voltage and beyond the connection of any filtering devices. These devices are shown as chokes 14 and 14a and condensers 15 and 15a, the former being in series in one line of the consumption circuit and the condensers being connected across the consumption circuit from points between the chokes 14 and 14a and on the load side of the choke 14a. These filtering devices are of the usual form and manner of connection.

Before considering the regulating effect under change of load conditions, the effect of the shunt path around the rectifier created by the windings 9, 9a of the reactor 8 should be considered. If a period of time be assumed when the reactor 6 and anode 5 are active in carrying current going to the consumption circuit, the reactor 6a and anode 5a being inactive, it is apparent that under these conditions, the windings 9, 9a provide a path for current to flow from one terminal of the secondary 3 through the reactor 6, windings 9, 9a, and thence through the reactor 6a to the other terminal of the secondary 3. The result is that by means of the shunt circuit formed by the windings 9, 9a, a current is caused to flow through the otherwise inactive reactor 6a in a direction opposite to that in which the current will flow when the reactor 6a becomes active in carrying current for the consumption circuit. The conditions thus set-up in the reactor 6a, as regards its flux and energy conditions, tend to establish in greater or lesser degree, as determined by the reactance of the windings 9, 9a the conditions which would exist if the reactor 6a had not been subjected to an inactive condition as regards supply of energy to the consumption circuit. Consequently, when the reactor 6a again becomes normally active, the amount of voltage which the reactor 6a is permitted to deliver to the consumption circuit, is correspondingly controlled as may be desired. It is evident that when the reactor 6a is active in the supply of the consumption circuit, the shunt path provided by the windings 9, 9a serves as a path for supplying controlling energy or current to the reactor 6 so as to correspondingly affect the voltage which the reactor 6 will be permitted to apply to the consumption circuit when it again becomes active in supplying the load current. The present invention automatically controls the amount of current permitted to pass through the shunt windings 9, 9a so as to condition each of the anode reactors 6, 6a during their otherwise inactive function, so as to permit the proper voltage to be applied to the consumption circuit under the different load conditions. The windings 10 and 13 on the middle leg of the reactor core 8 are so wound and connected that the magnetic fluxes which they respectively tend to create, are opposed to each other, as indicated by the arrows. These windings are so proportioned that these opposing fluxes under maximum load conditions, are approximately equal and, therefore, substantially offset each other. At that time the reactance of the windings 9, 9a, is a maximum and a comparatively slight current passes through the windings 9, 9a. Thus the controlling effect of these windings on the anode reactors 6, 6a is comparatively small and substantially full voltage which the rectifier circuit is capable of supplying to the load is not materially interfered with, as far as the windings 9, 9a are concerned. Upon decrease of the direct current load, the current through the series winding 10 is correspondingly decreased and its opposition to the flux of the winding 13 is correspondingly reduced. Thus a resultant flux due to the then difference in the ampere-turns passes from the middle leg of the core 8 and through the windings 9, 9a. This correspondingly reduces the reactance of the latter windings permitting an increase in the value of the current passing through them. This increased current alternately affects the reactors 6, 6a during their inactive periods so that when they alternately become active, the voltage applied to the consumption circuit is modified or reduced to an amount corresponding with that required for maintaining a constant voltage on the consumption circuit with the reduced load. Similarly any further decrease in the load will result in a corresponding increase in current through the windings 9, 9a and correspondingly condition the reactors 6, 6a during their inactive periods so as to maintain the voltage of the consumption circuit constant, even though the load has been further reduced. In this manner the supply of voltage by the rectifier to the direct current consumption circuit is regulated to be approximately constant under wide variations of the load. Regulation within 1% can readily be obtained by use of this invention in commercial practice.

By properly proportioning the windings of the controlling reactor with reference to each other, and by properly proportioning the core 8, the regulating effect may be one giving increasing voltage with decrease of load, instead of a substantially constant voltage; and likewise, if desired, the controlling effect may be such as to cause the voltage of the consumption circuit to decrease slightly with decrease in load. In fact, the increase or decrease in voltage of the direct current consumption circuit may be made as great or as small as desired by properly proportioning the windings, as will be understood by those skilled in the art.

Any form or type of rectifier may be used. Likewise the form of the controlling reactor and the arrangement of the windings thereon may be varied to suit particular conditions or preference of the designer, the perpendicular form shown being for general purpose of explanation. Also instead of using a full wave rectifier, two half-wave rectifiers may be used; and, in some cases, the invention may be applied to a half-wave rectifier when used alone. It will also be understood that the invention, although described as being utilized with a single phase of supply, is applicable to polyphase alternating current supply circuits in the usual manner of adaptation for polyphase use.

It will be understood that the invention may be embodied in various forms of apparatus and that various applications thereof may be made and various modifications adopted without departing from the scope of the invention.

I claim:

1. The combination of an alternating current supply circuit, a consumption circuit, a rectifier connected between said circuits, a reactive device in series in the circuit of each anode of the rectifier, a reactor core, a winding on said core connected from a point between one of said reactive devices and its corresponding anode to a point between another of said reactive devices and its corresponding anode, and a second winding on said core connected in series in the consumption circuit.

2. The combination of an alternating current supply circuit, a consumption circuit, a rectifier connected between said circuits, a reactive device in series in the circuit of each anode of the rectifier, a reactor core, a winding on said core connected from a point between one of said reactive devices and its corresponding anode to a point between another of said reactive devices and its corresponding anode, a second winding on said core connected in series in the consumption circuit, and a third winding on said core connected in shunt to said consumption circuit, the flux tending to be created by said second and third windings being opposed to each other.

3. The combination of an alternating current supply circuit, a consumption circuit, a rectifier connected between said circuits, a reactive device in series in a portion of the circuit of the rectifier subjected to alternate conducting periods in one direction of the supply current wave, and controlling means responsive to change of voltage in the consumption circuit for passing a variable controlling current through said reactive device during the alternate non-conducting periods of the supply current wave of said reactive device.

4. The combination of an alternating current supply circuit, a consumption circuit, a rectifier connected between said circuits, a reactive device in series in a portion of the circuit of the rectifier subjected to alternate conducting periods in one direction of the supply current wave, and controlling means responsive to change of current in the consumption circuit for passing a variable controlling current through said reactive device during the alternate non-conducting periods of the supply current wave of said reactive device.

5. The combination of an alternating current supply circuit, a consumption circuit, a rectifier connected between said circuits, a reactive device in series in a portion of the circuit of the rectifier subjected to alternate conducting periods in one direction of the supply current wave, and controlling means responsive to change of current and voltage in the consumption circuit for passing a variable controlling current through said reactive device during the alternate non-conducting periods of the supply current wave of said reactive device.

6. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, and controlling means responsive to change of current of the consumption circuit for variably affecting said device during the alternate non-conducting periods of the supply current wave of said portion of the circuit.

7. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a reactor core, an alternating current winding on said core connected in a shunt path between terminals of said rectifier for affecting the impedance of said device during the alternate non-conducting periods of the supply current wave of said portion of the circuit, and a controlling winding on said core responsive to a change of current of the consumption circuit for variably affecting the flux of said core.

8. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a reactor core, an alternating current winding on said core connected in a shunt path between terminals of said rectifier for affecting the impedance of said device during the alternate non-conducting periods of the supply current wave of said portion of the circuit, and a controlling winding on said core connected in series with the consumption circuit for variably affecting the flux of said core.

9. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a reactor core, an alternating current winding on said core connected in a shunt path between terminals of said rectifier for affecting the impedance of said device during the alternate non-conducting periods of the supply current wave of said portion of the circuit, a winding on said core connected in shunt to the consumption circuit, and a winding on said core connected in series with the consumption circuit for variably affecting the flux of said core.

10. The combination of an alternating current supply circuit, a consumption circuit, a rectifier connected between said circuits, an impedance device having inductance reactance connected in series in a portion of the rectifier circuit subjected to alternate conducting periods in one direction of the supply current wave, a reactor core, an alternating current winding on said core connected in a shunt path between terminals of said rectifier for affecting the impedance of said device during the alternate non-conducting periods of the supply current wave of said portion of the circuit, a winding on said core connected in shunt to the consumption circuit, and a winding on said core connected in series with the consumption circuit, said last named two windings have the flux tending to be created thereby opposed to each other for variably affecting the flux of said core.

11. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a reactor core, an alternating current winding on said core connected to pass a current through said impedance device during the alternate non-conducting periods of the supply current wave of said device, and controlling means responsive to change of current of the consumption circuit for variably affecting the flux of said core and reactance of said winding.

12. The method of controlling the voltage derived from an alternating current source, which comprises rectifying the alternating current in a series of conducting and non-conducting periods, and adjusting the inductive reactance of a portion of the rectifying circuit during its alternate non-conducting periods of the supply current wave for controlling according to the load on the consumption circuit the voltage which is to be delivered to the consumption circuit.

13. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a controlling impedance device connected in a shunt path between terminals of said rectifier for passing a current through said first named impedance device during its alternate non-conducting periods of the supply current wave for controlling the output of the rectifier and in a direction reverse to that of its supply current wave to the rectifier, and means responsive to change of current in the consumption circuit for affecting the impedance of said controlling impedance device.

14. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a controlling impedance device connected in a shunt path between terminals of said rectifier for passing a current through said first named impedance device during its alternate non-conducting periods of the supply current wave for controlling the output of the rectifier and in a direction reverse to that of its supply current wave to the rectifier, and means responsive to change of load in the consumption circuit for affecting the impedance of said controlling impedance device.

15. The combination of an alternating current supply circuit, a consumption circuit, a rectifier connected between said circuits, an impedance device having inductive reactance connected in series in a portion of the rectifier circuit subjected to alternate conducting periods in one direction of the supply current wave, a controlling impedance device connected in a shunt path between terminals of said rectifier for passing a current through said first named impedance device during its alternate non-conducting periods of the supply current wave for controlling the output of the rectifier and in a direction reverse to that of its supply current wave to the rectifier, and means responsive to a decrease in current in the consumption circuit for reducing the impedance of said controlling impedance device.

16. The combination of an alternating current supply circuit, a consumption circuit, a rectifier connected between said circuits, a reactive device connected in series in a portion of the rectifier circuit subjected to alternate conducting periods in one direction of the supply current wave, and connected to a terminal of said rectifier, a controlling impedance device connected in a shunt path between terminals of said rectifier for passing current through said reactive device during its alternate non-conducting periods of the supply current wave for controlling the output of the rectifier and in a direction reverse to that of its supply current wave to the rectifier, a terminal of said controlling impedance device being connected between said reactive device and said terminal of the rectifier, and means responsive to change of load in the consumption circuit for affecting the impedance of said controlling impedance device.

17. The combination of an alternating current supply circuit, a consumption circuit, a rectifier connected between said circuits, a reactive device connected in series in a portion of the rectifier circuit subjected to alternate conducting periods in one direction of the supply current wave, and connected with a terminal of said rectifier, a controlling impedance device connected in a shunt path between terminals of said rectifier for passing current through said reactive device during its alternate non-conducting periods of the supply current wave for controlling the output of the rectifier and in a direction reverse to that of its supply current wave to the rectifier, a terminal of said controlling impedance device being connected between said reactive device and said terminal of the rectifier, and means responsive to change of current in the consumption circuit for affecting the impedance of said controlling impedance device.

FRANK G. LOGAN.